United States Patent
Nhep et al.

(10) Patent No.: US 9,638,869 B2
(45) Date of Patent: *May 2, 2017

(54) FIBER OPTIC CONNECTOR

(71) Applicant: CommScope Technologies LLC, Hickory, NC (US)

(72) Inventors: Ponharith Nhep, Savage, MN (US); Patrick Nault, Carver, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/928,799

(22) Filed: Oct. 30, 2015

(65) Prior Publication Data

US 2016/0124159 A1 May 5, 2016

Related U.S. Application Data

(63) Continuation of application No. 13/887,053, filed on May 3, 2013, now Pat. No. 9,176,285.
(Continued)

(51) Int. Cl.
*G02B 6/36* (2006.01)
*G02B 6/00* (2006.01)
(Continued)

(52) U.S. Cl.
CPC ...... *G02B 6/3821* (2013.01); *B29C 45/14065* (2013.01); *G02B 6/387* (2013.01);
(Continued)

(58) Field of Classification Search
CPC .. G02B 6/3821; G02B 6/3825; G02B 6/3861; G02B 6/3865; G02B 6/3869;
(Continued)

(56) References Cited

U.S. PATENT DOCUMENTS 3,395,244 A    7/1968   Koehler
4,050,783 A    9/1977   Tardy
(Continued)

FOREIGN PATENT DOCUMENTS

CN         1737628      2/2006
EP    0 479 415 A2    4/1992
(Continued)

*Primary Examiner* — Akm Enayet Ullah
*Assistant Examiner* — Michael Mooney
(74) *Attorney, Agent, or Firm* — Merchant & Gould P.C.

(57) ABSTRACT

The present disclosure relates to a fiber optic connector and cable assembly. The fiber optic connector includes a connector body and ferrule assembly mounted in the connector body. A spring is positioned within the connector body for biasing the ferrule assembly in a forward direction. The spring has a first spring length when the ferrule assembly is in a forwardmost position. A rear housing of the connector body includes a front extension that fits inside a rear end of the spring, the front extension having a front extension length. The fiber optic connector defines a gap between the front extension and a ferrule hub of the ferrule assembly, the gap having a first dimension measured between the front extension and the ferrule hub when the ferrule assembly is in the forwardmost position, the front extension length being longer than the first dimension.

17 Claims, 9 Drawing Sheets

Related U.S. Application Data (60) Provisional application No. 61/642,122, filed on May 3, 2012.

(51) Int. Cl.
| | |
|---|---|
| *G02B 6/38* | (2006.01) |
| *B29C 45/14* | (2006.01) |
| *B29K 63/00* | (2006.01) |
| *B29L 11/00* | (2006.01) |

(52) U.S. Cl.
CPC ......... *G02B 6/3861* (2013.01); *G02B 6/3869* (2013.01); *G02B 6/3887* (2013.01); *G02B 6/3893* (2013.01); *B29K 2063/00* (2013.01); *B29L 2011/0075* (2013.01); *G02B 6/3865* (2013.01)

(58) Field of Classification Search
CPC .... G02B 6/387; G02B 6/3881; G02B 6/3887; G02B 6/3893; B29D 11/00663
USPC ........... 385/55, 60, 69, 72, 74–87, 100, 139; 264/1.24, 1.25
See application file for complete search history.

(56) References Cited

U.S. PATENT DOCUMENTS

| | | | |
|---|---|---|---|
| 4,190,316 A | 2/1980 | Malsby et al. | |
| 4,225,214 A | 9/1980 | Hodge et al. | |
| 4,291,941 A | 9/1981 | Melzer | |
| 4,309,071 A | 1/1982 | Prunier | |
| 4,320,938 A | 3/1982 | Gunnersen et al. | |
| 4,373,777 A | 2/1983 | Borsuk et al. | |
| 4,588,256 A | 5/1986 | Onstott et al. | |
| 4,669,820 A | 6/1987 | Ten Berge | |
| 4,746,194 A | 5/1988 | Rasmussen | |
| 4,787,699 A | 11/1988 | Moulin | |
| 4,807,958 A | 2/1989 | Gunner et al. | |
| 4,850,671 A | 7/1989 | Finzel | |
| 4,984,865 A | 1/1991 | Lee et al. | |
| 5,094,552 A | 3/1992 | Monroe et al. | |
| RE34,005 E | 7/1992 | Levinson et al. | |
| 5,151,961 A | 9/1992 | Hvezda et al. | |
| 5,261,019 A | 11/1993 | Beard et al. | |
| 5,317,633 A | 5/1994 | Hiraiwa | |
| 5,321,784 A | 6/1994 | Cubukciyan et al. | |
| 5,390,272 A | 2/1995 | Repta et al. | |
| 5,418,876 A | 5/1995 | Lee | |
| 5,446,819 A | 8/1995 | Foster et al. | |
| 5,469,521 A | 11/1995 | Coutts et al. | |
| 5,611,017 A | 3/1997 | Lee et al. | |
| 5,631,986 A | 5/1997 | Frey et al. | |
| 5,647,043 A | 7/1997 | Anderson et al. | |
| 5,748,819 A | 5/1998 | Szentesi et al. | |
| 5,802,230 A | 9/1998 | Kuribayashi et al. | |
| 5,806,175 A | 9/1998 | Underwood | |
| 5,862,282 A | 1/1999 | Matsuura et al. | |
| 5,883,988 A | 3/1999 | Yamamoto et al. | |
| 5,883,995 A | 3/1999 | Lu | |
| 5,915,056 A | 6/1999 | Bradley et al. | |
| 5,953,476 A | 9/1999 | Abe | |
| 5,960,141 A | 9/1999 | Sasaki et al. | |
| 6,054,007 A | 4/2000 | Boyd et al. | |
| 6,079,880 A | 6/2000 | Blom | |
| 6,142,676 A | 11/2000 | Lu | |
| 6,179,658 B1 | 1/2001 | Gunay et al. | |
| 6,325,670 B2 | 12/2001 | Murayama | |
| 6,341,898 B1 | 1/2002 | Matsushita | |
| 6,419,402 B1 * | 7/2002 | Zimmel | G02B 6/3869 385/86 |
| 6,432,511 B1 | 8/2002 | Davis et al. | |
| 6,456,768 B1 | 9/2002 | Boncek et al. | |
| 6,513,989 B1 | 2/2003 | Bleck et al. | |
| 6,543,941 B1 | 4/2003 | Lampert | |
| 6,550,977 B2 | 4/2003 | Hizuka | |
| 6,695,489 B2 | 2/2004 | Nault | |
| 6,782,182 B2 | 8/2004 | Dautartas et al. | |
| 6,793,404 B2 | 9/2004 | Kraus et al. | |
| 6,796,721 B2 | 9/2004 | Matsumoto et al. | |
| 6,811,321 B1 | 11/2004 | Schmalzigaug et al. | |
| 6,811,323 B2 | 11/2004 | Murray et al. | |
| 6,819,858 B2 | 11/2004 | Steinberg et al. | |
| 6,848,837 B2 | 2/2005 | Gilligan | |
| 6,893,591 B2 | 5/2005 | Davis et al. | |
| 6,945,706 B2 | 9/2005 | Gimbel et al. | |
| 7,147,384 B2 | 12/2006 | Hardcastle et al. | |
| 7,147,385 B2 | 12/2006 | Zimmel et al. | |
| 7,184,634 B2 | 2/2007 | Hurley et al. | |
| 7,290,941 B2 | 11/2007 | Kiani et al. | |
| 7,352,938 B2 | 4/2008 | Bianchi | |
| 7,407,331 B2 | 8/2008 | Momotsu et al. | |
| 7,467,896 B2 | 12/2008 | Melton et al. | |
| 7,488,115 B2 * | 2/2009 | Theis | G02B 6/3825 385/55 |
| 7,490,994 B2 | 2/2009 | Scadden et al. | |
| 7,534,050 B2 | 5/2009 | Kachmar | |
| 7,534,051 B2 | 5/2009 | Nishioka et al. | |
| 7,537,393 B2 | 5/2009 | Anderson et al. | |
| 7,553,089 B2 | 6/2009 | Gurreri et al. | |
| 7,578,623 B2 | 8/2009 | Wang et al. | |
| 7,677,812 B2 | 3/2010 | Castagna et al. | |
| 7,758,256 B2 | 7/2010 | Hopkins et al. | |
| 7,758,257 B2 | 7/2010 | Anderson et al. | |
| 7,766,556 B2 | 8/2010 | Kachmar | |
| 7,802,926 B2 | 9/2010 | Leeman et al. | |
| 7,881,576 B2 | 2/2011 | Melton et al. | |
| 7,918,609 B2 | 4/2011 | Melton et al. | |
| 7,942,591 B2 | 5/2011 | Hopkins et al. | |
| 8,038,356 B2 | 10/2011 | Marcouiller et al. | |
| 8,224,141 B2 | 7/2012 | Kachmar et al. | |
| 8,256,969 B2 | 9/2012 | Arai et al. | |
| 8,342,755 B2 | 1/2013 | Nhep | |
| 8,391,658 B2 * | 3/2013 | Kachmar | B29D 11/00663 385/100 |
| 8,548,293 B2 | 10/2013 | Kachmar | |
| 8,636,425 B2 | 1/2014 | Nhep | |
| 8,702,323 B2 | 4/2014 | Nhep | |
| 9,176,285 B2 * | 11/2015 | Nhep | G02B 6/3869 |
| 2001/0033730 A1 | 10/2001 | Fentress | |
| 2002/0067894 A1 | 6/2002 | Scanzillo | |
| 2003/0063868 A1 | 4/2003 | Fentress | |
| 2004/0057672 A1 | 3/2004 | Doss et al. | |
| 2005/0281509 A1 | 12/2005 | Cox et al. | |
| 2006/0002662 A1 | 1/2006 | Manning et al. | |
| 2010/0254659 A1 | 10/2010 | Anderson et al. | |
| 2012/0288238 A1 | 11/2012 | Park et al. | |
| 2012/0328247 A1 | 12/2012 | Kachmar | |

FOREIGN PATENT DOCUMENTS

| | | |
|---|---|---|
| EP | 0 689 070 A1 | 12/1995 |
| EP | 0 810 455 A1 | 12/1997 |
| EP | 0 916 974 A2 | 5/1999 |
| GB | 2 062 283 A | 5/1981 |
| JP | 59-177513 | 10/1984 |
| JP | 61-284710 | 12/1986 |
| JP | 4-40402 | 2/1992 |
| JP | 8-122567 | 5/1996 |
| JP | 2002-82257 | 3/2002 |
| JP | 2009-192908 | 8/2009 |
| JP | 2011-2705 | 1/2011 |
| WO | WO 97/23797 | 7/1997 |
| WO | WO 01/42836 A2 | 6/2001 |
| WO | WO 2012/005407 A1 | 1/2002 |
| WO | WO 2010/039837 A1 | 4/2010 |
| WO | WO 2010/118031 | 10/2010 |

* cited by examiner

FIBER OPTIC CONNECTOR

CROSS-REFERENCE TO RELATED APPLICATION

This application is a continuation of U.S. patent application Ser. No. 13/887,053, filed May 3, 2013, now U.S. Pat. No. 9,176,285, which claims the benefit of U.S. Provisional Patent Application Ser. No. 61/642,122, filed May 3, 2012, which applications are hereby incorporated by reference in their entirety.

TECHNICAL FIELD

The present disclosure relates generally to optical fiber communication systems. More particularly, the present disclosure relates to fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a front end of a connector housing. A spring is used to bias the ferrule assembly in a forward direction relative to the connector housing. The ferrule functions to support an end portion of at least one optical fiber (in the case of a multi-fiber ferrule, the ends of multiple fibers are supported). The ferrule has a front end face at which a polished end of the optical fiber is located. When two fiber optic connectors are interconnected, the front end faces of the ferrules abut one another, and the ferrules are forced rearwardly relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

A fiber optic connector is often secured to the end of a corresponding fiber optic cable by anchoring strength members of the cable to the connector housing of the connector. Anchoring is typically accomplished through the use of conventional techniques such as crimps or adhesive. Anchoring the strength members of the cable to the connector housing is advantageous because it allows tensile load applied to the cable to be transferred from the strength members of the cable directly to the connector housing. In this way, the tensile load is not transferred to the ferrule assembly of the fiber optic connector. If the tensile load were to be applied to the ferrule assembly, such tensile load could cause the ferrule assembly to be pulled in a rearward direction against the bias of the connector spring thereby possibly causing an optical disconnection between the connector and its corresponding mated connector. Fiber optic connectors of the type described above can be referred to as pull-proof connectors.

A number of factors are important with respect to the design of fiber optic connectors, especially those connectors referred to as pull-proof connectors. One aspect relates to ease of manufacturing and assembly. Another aspect relates to connector size and the ability to provide enhanced connector/circuit densities. Still another aspect relates to the ability to provide high signal quality connections with minimal signal degradation.

SUMMARY

One aspect of the present disclosure relates to a fiber optic connector having features that facilitate connector assembly. For example, such features can include structures for enhancing guiding optical fibers into a connector during assembly, and for facilitating applying epoxy into a ferrule of a connector during assembly.

According to one example embodiment, the fiber optic connector of the present disclosure includes a connector body defining a longitudinal axis, the connector body including a front housing that connects to a rear housing, the front and rear housings having lengths that extend along the longitudinal axis. A ferrule assembly is mounted at least partially in the connector body, the ferrule assembly being movable relative to the connector body along the longitudinal axis, the ferrule assembly including a ferrule having a rear end supported in a ferrule hub, the ferrule having a front face accessible at a front end of the connector body, the ferrule defining a fiber passage that extends through the ferrule along the central longitudinal axis from the rear end of the ferrule to the front face of the ferrule. A spring is positioned within the connector body for biasing the ferrule assembly in a forward direction toward a forwardmost position of the ferrule assembly, the spring having a first spring length when the ferrule assembly is in the forwardmost position. The rear housing includes a front extension that fits inside a rear end of the spring, the front extension having a front extension length, and the fiber optic connector defines a gap between the front extension of the rear housing and the ferrule hub, the gap having a first dimension measured between the front extension of the rear housing and the ferrule hub when the ferrule assembly is in the forwardmost position, the first dimension being measured in an orientation along the longitudinal axis of the connector body, the front extension length being longer than the first dimension of the gap.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

FIGS. 1-15 illustrate a first embodiment of a fiber optic connector 10 in accordance with the principles of the present disclosure. In the present disclosure, the fiber optic connector 10 is depicted as an LC connector. However, the inventive features discussed herein may be applicable to fiber optic connectors having other types of footprints.

Figure 1:
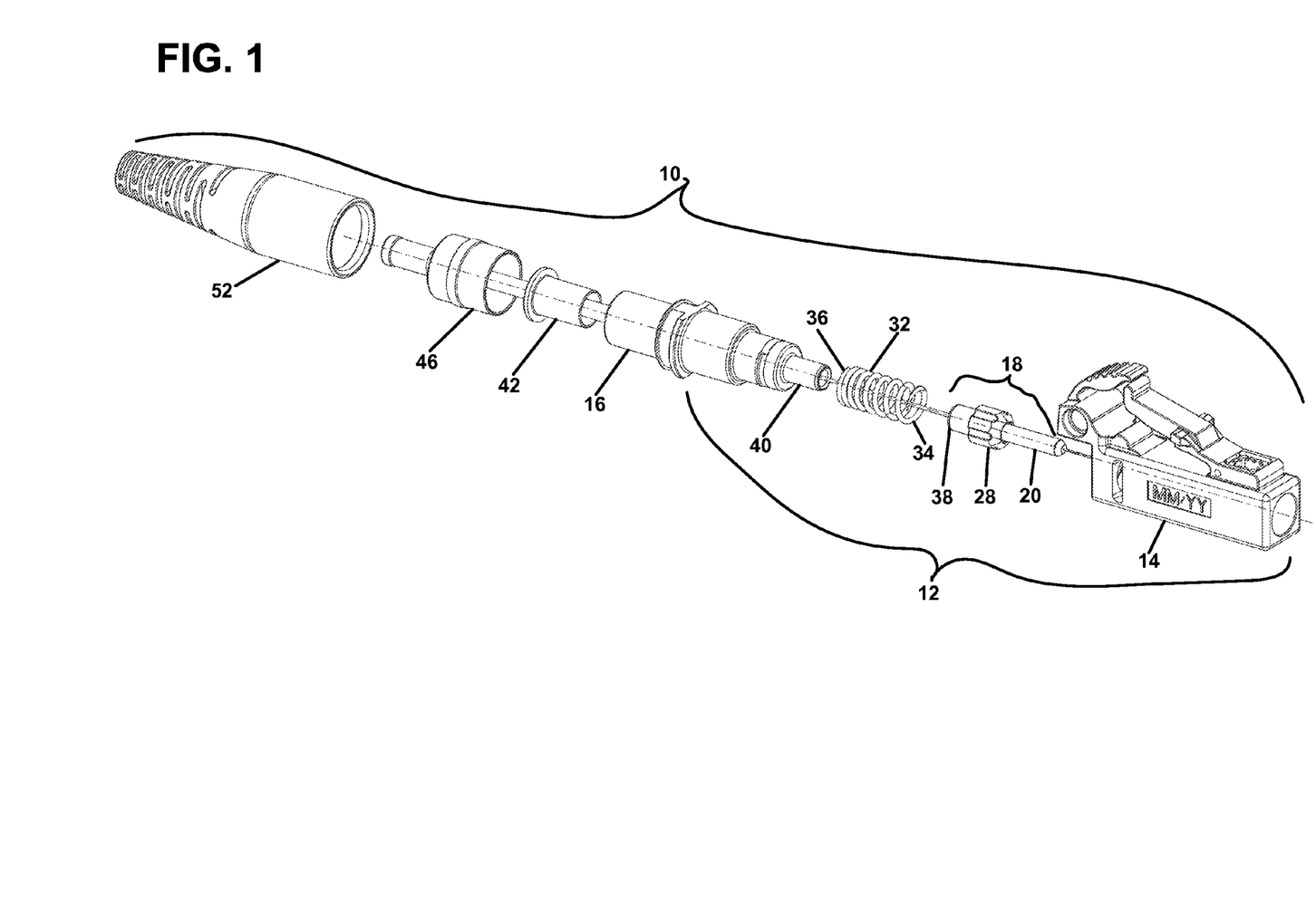
FIG. 1 is a perspective, exploded view of a fiber optic connector in accordance with the principles of the present disclosure.

A perspective exploded view of the fiber optic connector 10 is illustrated in FIG. 1, showing the different components of the fiber optic connector 10. Referring to FIG. 1, the fiber optic connector 10 includes a connector body 12 that defines a longitudinal axis $A_L$. The connector body 12 is formed from a front housing 14 that couples to a rear housing 16, wherein the front and rear housings 14, 16 define lengths $L_{FH}$, $L_{RH}$ that extend along the longitudinal axis $A_L$. The front housing 14 is shown in isolation in FIGS. 4-9, and the rear housing 16 is shown in isolation in FIGS. 10-12.

Figure 2:
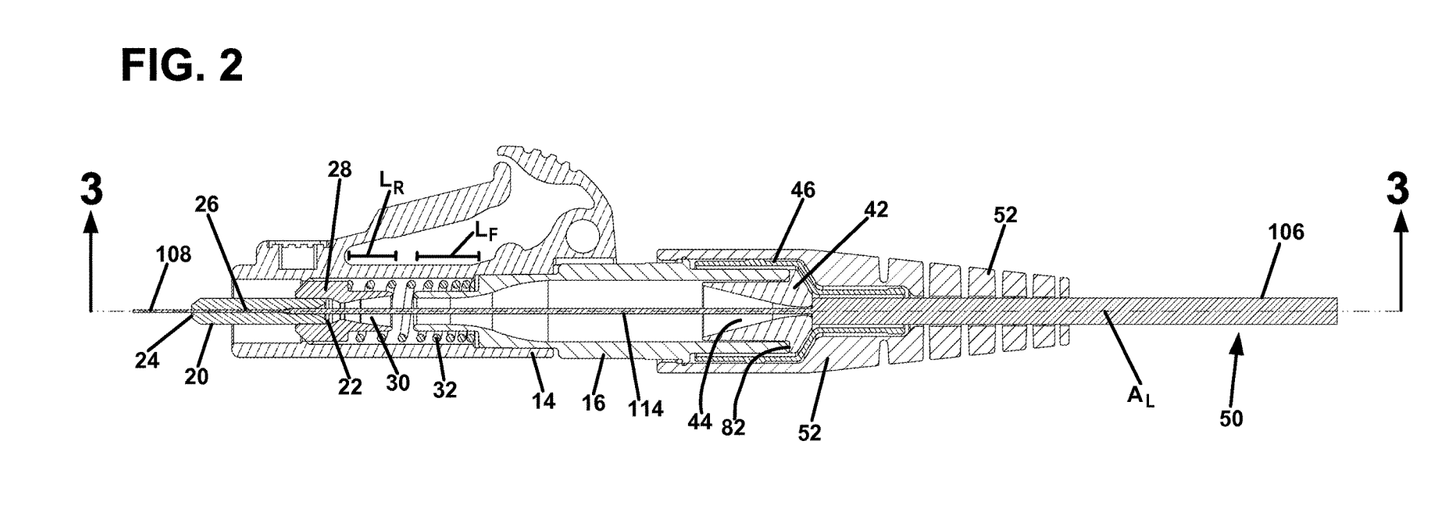
FIG. 2 is a cross-sectional view that longitudinally bisects the fiber optic connector of FIG. 1.
Figure 3:
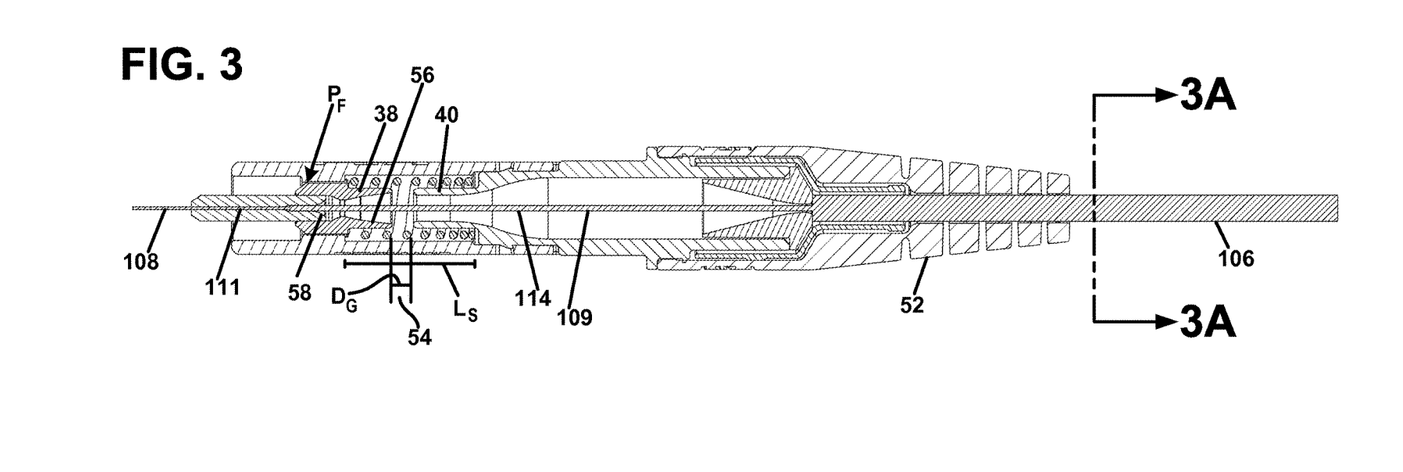
FIG. 3 is a cross-sectional view taken along line 3-3 of FIG. 2.
Figure 3A:
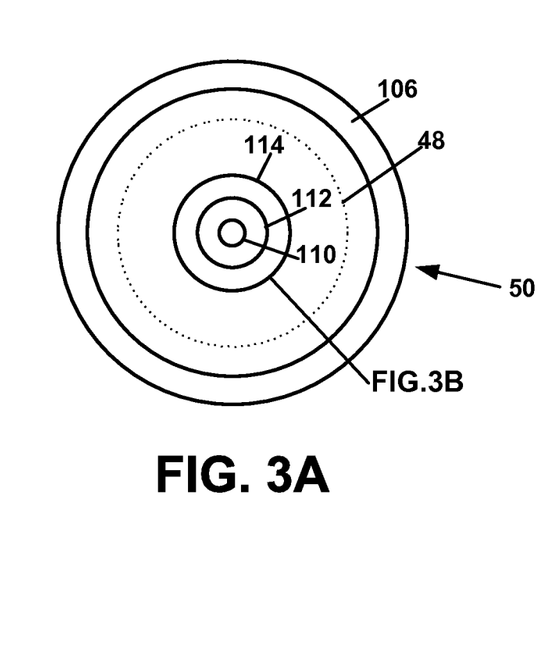
FIG. 3A is a cross-sectional view taken along line 3A-3A of FIG. 3.

Still referring to FIG. 1, the fiber optic connector 10 further includes a ferrule assembly 18 configured to be mounted at least partially within the connector body 12. The ferrule assembly 18 includes a ferrule 20 defining a rear end 22 and a front face 24. The ferrule 20 defines a fiber passage 26 that extends through the ferrule 20 along the longitudinal axis $A_L$ from the rear end 22 of the ferrule 20 to the front face 24 of the ferrule 20. The ferrule assembly 18 further includes a ferrule hub 28. The rear end 22 of the ferrule 20 is supported in the ferrule hub 28. The ferrule hub 28 defines a ferrule hub passage 30 that co-axially aligns with the fiber passage 26 of the ferrule 20 (as shown in FIGS. 2 and 3).

The ferrule assembly 18 is configured to be movable relative to the connector body 12 along the longitudinal axis $A_L$ of the connector body 12. A spring 32 positioned within the connector body 12 is configured to bias the ferrule assembly 18 in a forward direction toward a forwardmost position $P_F$ of the ferrule assembly 18. When the ferrule assembly 18 is in its forwardmost position $P_F$ within the connector body 12, the spring 32 defines a first spring length $L_S$. When the fiber optic connector 10 is coupled optically to another fiber optic connector via a fiber optic adapter, the front faces 24 of the ferrules 20 may abut one another, forcing the ferrule hubs 28 rearwardly and compressing the springs 32.

Still referring to FIG. 1, the spring 32 that is configured to bias the ferrule assembly 18 in a forward direction defines a front end 34 and a rear end 36. The ferrule hub 28 includes a rear extension 38 that fits inside the front end 34 of the spring 32. The rear housing 16 of the fiber optic connector 10 includes a front extension 40 that fits inside the rear end 36 of the spring 32. As such, the spring 32 is captured within the front housing 14 between the ferrule assembly 18 and the rear housing 16 when the rear housing 16 is connected to the front housing 14. The front extension 40 of the rear housing 16 defines a front extension length $L_F$.

Still referring to FIG. 1, the fiber optic connector 10 also includes an end cap 42 that fits within a rear end 82 of the rear housing 16. The end cap 42 defines an end cap passage 44 that extends along the longitudinal axis $A_L$ of the connector body 12. The end cap 42, according to certain embodiments, may be a machined metal part.

A crimp sleeve 46 is secured over the rear end 82 of the rear housing 16. As will be discussed in further detail below, the crimp sleeve 46 is used for crimping a strength member layer 48 of a fiber optic cable 50 terminated to the fiber optic connector 10 against the rear end 82 of the rear housing 16, also capturing and retaining the end cap 42 within the rear housing 16.

Still referring to FIG. 1, a strain relief boot 52 is mounted over the rear end 82 of the rear housing 16 to cover the crimp sleeve 46 and the end cap 42 and to provide strain relief for the fiber optic cable 50 terminated to the fiber optic connector 10.

Referring now to FIGS. 2 and 3, the fiber optic connector 10 is shown with a fiber optic cable 50 terminated thereto. In FIGS. 2 and 3, internal features of the different parts of the fiber optic connector 10 are also illustrated via cross-sectional views.

In FIGS. 2 and 3, the ferrule assembly 18 is shown at the forwardmost position $P_F$ thereof. When the ferrule assembly 18 is at its forwardmost position $P_F$, the spring 32 defines the first spring length $L_S$. The fiber optic connector 10 is configured such that there is a gap 54 defined between the front extension 40 of the rear housing 16 and the rear extension 38 of the ferrule hub 28. The gap 54 has a first dimension $D_G$ measured between the front extension 40 of the rear housing 16 and the ferrule hub 28 when the ferrule assembly 18 is in the forwardmost position $P_F$, the first dimension $D_G$ being measured in an orientation along the longitudinal axis $A_L$ of the connector body 12. The fiber optic connector 10 is configured such that the front extension length $L_F$ of the front extension 40 of the rear housing 16 is longer than the first dimension $D_G$ defined by the gap 54.

According to one embodiment, the first dimension $D_G$ defined by the gap 54 is at most 25 percent of the first spring length $L_S$, the first spring length $L_S$ defined when the ferrule assembly 18 is at its forwardmost position $P_F$. According to another embodiment, the front extension length $L_F$ is at least 25 percent of the first spring length $L_S$.

As noted above, the ferrule hub 28 defines a rear extension 38 that fits inside the front end 34 of the spring 32. The fiber optic connector 10 is configured such that, according to one example embodiment, the rear extension 38 defines a rear extension length $L_R$ that is at least 25 percent of the first spring length $L_S$, wherein the first dimension $D_G$ defined by the gap 54 is measured between the front extension 40 of the rear housing 16 and the rear extension 38 of the ferrule hub 28.

According to another example embodiment, the front extension length $L_F$ of the rear housing front extension 40 is longer than the rear extension length $L_R$ of the ferrule hub rear extension 38. According to one example embodiment, the first dimension $D_G$ defined by the gap 54 is about 0.033 inches, the front extension length $L_F$ of the rear housing 16 is about 0.124 inches, and the first spring length $L_S$ (when the ferrule assembly 18 is at its forwardmost position $P_F$) is about 0.241 inches.

Still referring to FIGS. 2 and 3, as shown, the ferrule hub passage 30 defined by the ferrule hub 28 includes a tapered portion 56 within the rear extension 38 that tapers inwardly as the tapered portion 56 extends in a forward direction. As also shown in detail in FIGS. 2 and 3, the fiber passage 26 of the ferrule 20 that co-axially aligns with the ferrule hub passage 30 has a tapered portion 58 at the rear end 22 of the ferrule 20, the tapered portion 58 of the fiber passage 26 tapering inwardly as the fiber passage 26 extends in the forward direction. The tapered portions 56, 58 of the ferrule hub passage 30 and the fiber passage 26 facilitate fiber guiding and insertion during termination of a fiber optic cable 50 to the fiber optic connector 10 of the present disclosure.

Referring now to FIGS. 4-9, the front housing 14 of the fiber optic connector 10 is shown in isolation. According to certain embodiments, the front housing 14 may be formed from molded polymeric materials.

The front housing 14 defines a latch 60 extending from a top wall 62 of the front housing 14 toward a rear end 65 of the front housing 14, the latch 60 extending at an acute angle A with respect to the top wall 62 of the front housing 14. According to certain embodiments, the latch 60 may be integrally formed with the front housing 14. The front housing 14 also includes a latch trigger 64 that extends from the rear end 65 of the front housing 14 toward a front end 66. The latch trigger 64 also extends at an acute angle A with respect to the top wall 62. The latch trigger 64 is configured to come into contact with the latch 60 for elastically moving the latch 60 toward the top wall 62 of the front housing 14.

As is known in the art, when the fiber optic connector 10 is placed in a fiber optic adapter (e.g., an LC type fiber optic adapter) for optically coupling light from two optical fibers together, the latch 60 functions to lock the fiber optic connector 10 within the adapter. The fiber optic connector 10 may be removed from the adapter by depressing the latch trigger 64, which causes the latch 60 to be pressed in a downward direction, freeing catch portions 68 of the latch 60 from the fiber optic adapter.

The portion of the front housing 14 from where the latch trigger 64 extends defines a pin hole 70. The pin hole 70 is configured to receive a pin for forming a duplex LC connector by coupling two simplex connectors 10 in a side-by-side orientation.

Still referring to FIGS. 4-9, in the depicted embodiment, the front housing 14 defines openings 72 on sidewalls 74 thereof for receiving retention tabs 76 of the rear housing 16 for coupling the rear housing 16 to the front housing 14 with a snap-fit interlock.

Figure 10:
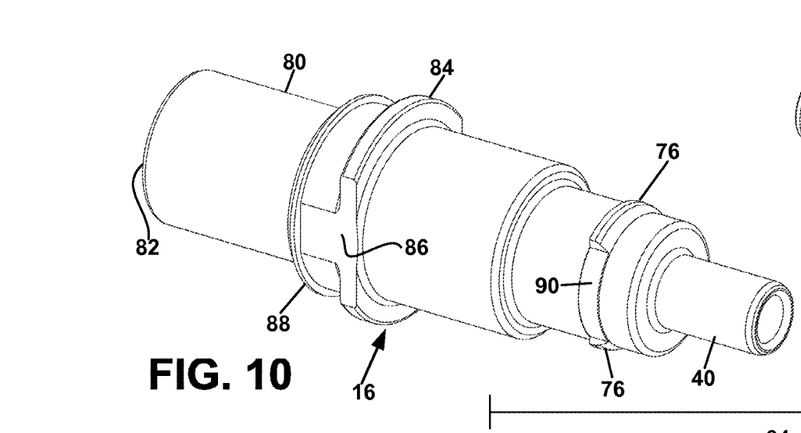
FIG. 10 is a front perspective view of a rear housing of the fiber optic connector of FIG. 1.
Figure 11:
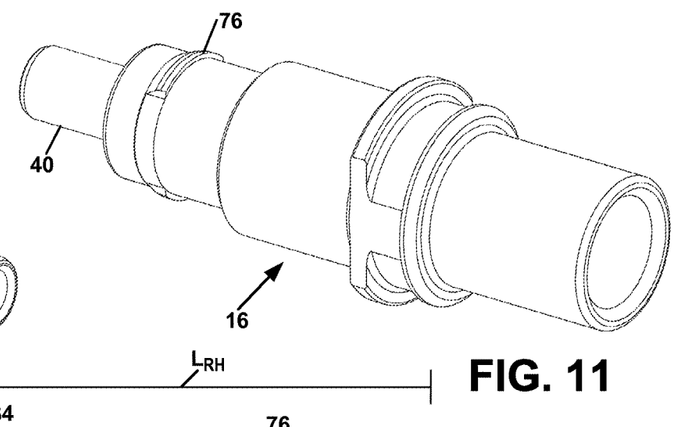
FIG. 11 is a rear perspective of the rear housing of FIG. 10.
Figure 12:
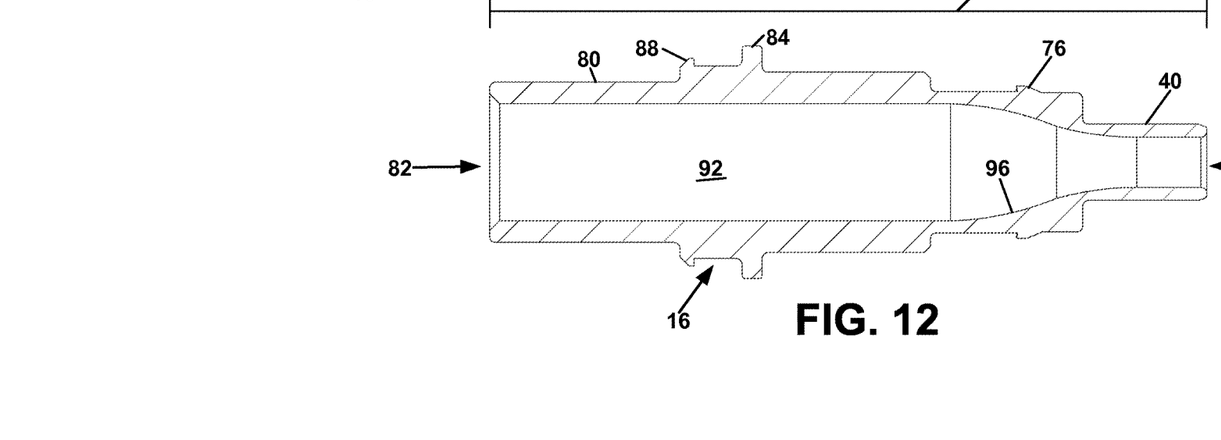
FIG. 12 is a cross-sectional view that longitudinally bisects the rear housing of FIGS. 10-11.

Now referring to FIGS. 10-12, the rear housing 16 of the fiber optic connector 10 is illustrated in isolation. According to certain embodiments, the rear housing 16 may be a machined metal part. The rear housing 16 defines the front extension 40 at a front end 78 of the rear housing 16 and defines a crimp region 80 at the rear end 82 of the rear housing 16. As will be discussed in further detail below, the crimp region 80 is configured for crimping a fiber optic cable's strength member layer 48 to the rear housing 16, for example, with the use of the crimp sleeve 46. The exterior surface of the rear housing 16 defining the crimp region 80 may be textured (e.g., knurled, ridged, provided with small projections, etc.) to assist in retaining the crimp sleeve 46 on the rear housing 16.

Still referring to FIGS. 10-12, the rear housing 16 includes a first outer shoulder 84 positioned at an intermediate location along the length $L_{RH}$ of the rear housing 16. The rear housing 16 defines a pair of flats 86 on opposing sides of the rear housing 16 at the first outer shoulder 84. The rear housing 16 also defines a second outer shoulder 88 at an intermediate location along the length $L_{RH}$ of the rear housing 16, the second outer shoulder 88 positioned rearward of the first outer shoulder 84 and separated by a spacing measured along the longitudinal axis $A_L$ of the connector body 12. As illustrated in the cross-sectional views in FIGS. 2 and 3, the first and second outer shoulders 84, 88 are configured and spaced such that the strain relief boot 52 (shown in detail in FIGS. 13-15) of the fiber optic connector 10 snaps over the second outer shoulder 88 and abuts against the first outer shoulder 84 in coupling the boot 52 to the connector body 12.

The rear housing 16 also defines the retention tabs 76 for insertion into the openings 72 of the front housing 14 in coupling the rear housing 16 to the front housing 14. The flats 86 defined at the first outer shoulder 84 of the rear housing 16 may assist during the assembly of the rear housing 16 to the front housing 14 by providing contact points for an assembly tool that uses the flats 86 to correctly orient the retention tabs 76 with respect to the openings 72 of the front housing 14. The flats 86 align with notches 90 defined between the retention tabs 76 for such alignment purpose.

The rear housing 16 defines a rear housing passage 92 that extends along the longitudinal axis $A_L$ of the connector body 12. According to the depicted embodiment, the rear housing passage 92 is defined by a surface 96 that tapers inwardly as the passage 92 transitions forwardly toward the front extension 40 of the rear housing 16.

Figures 13, 14, 15:
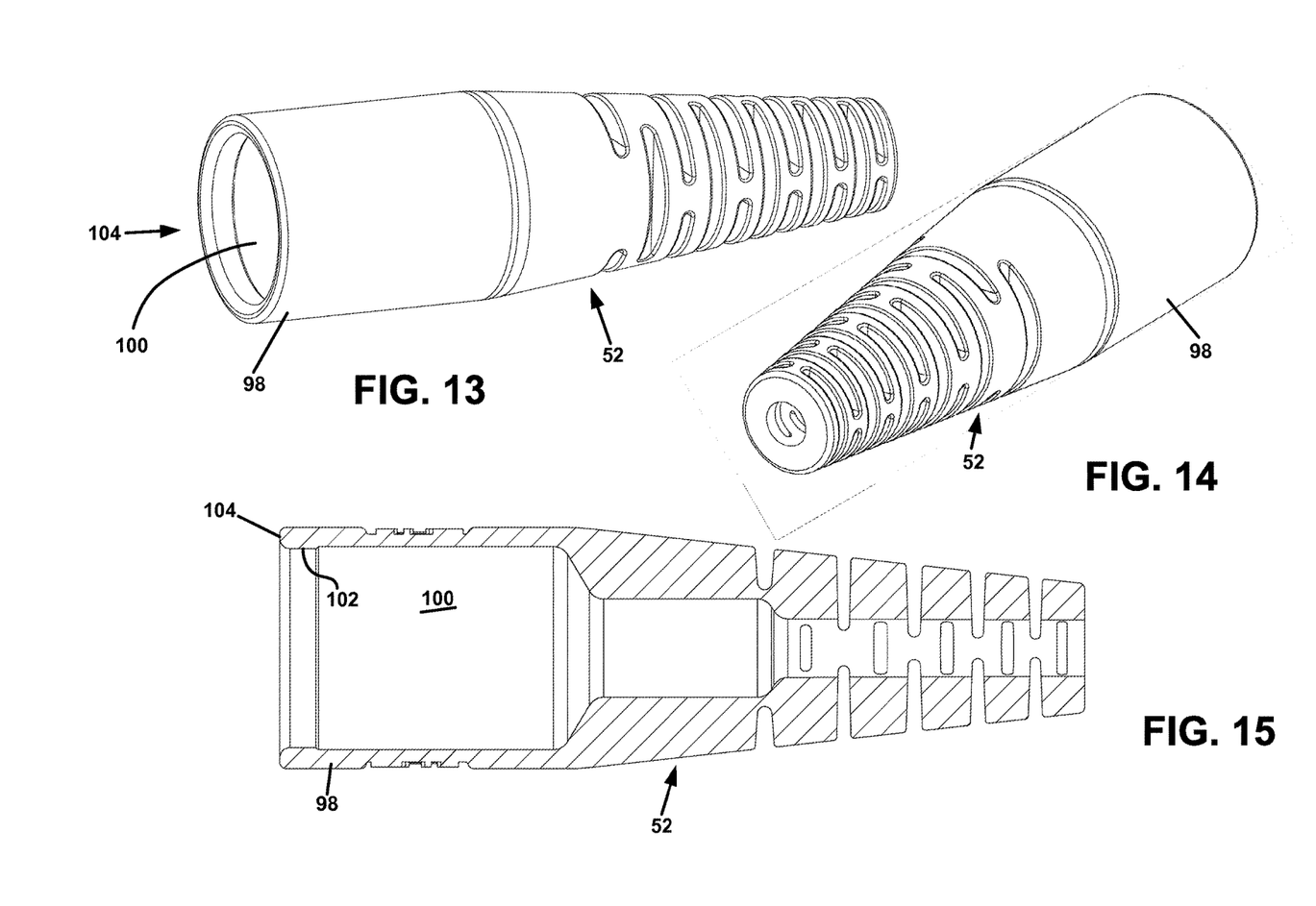
FIG. 13 is a front perspective view of a strain relief boot of the fiber optic connector of FIG. 1.
FIG. 14 is a rear perspective view of the boot of FIG. 13.
FIG. 15 is a cross-sectional view that longitudinally bisects the boot of FIG. 13.

The strain relief boot 52 is illustrated in FIGS. 13-15. The strain relief boot 52 is mounted over the rear end 82 of the rear housing 16. The strain relief boot 52 includes a coupling portion 98 defining a generally circular inner passage 100. An annular inner lip 102 defined adjacent a front end 104 of the strain relief boot 52 snaps over the second outer shoulder 88 of the rear housing 16. When the strain relief boot 52 is mounted over the rear end 82 of the rear housing 16, the front end 104 of the strain relief boot 52 abuts against the first outer shoulder 84.

The assembly of the fiber optic connector 10 and the termination of a fiber optic cable 50 thereto are now described herein with reference to FIGS. 1-3, 3A, 3B, 18, and 19.

Figure 3B:
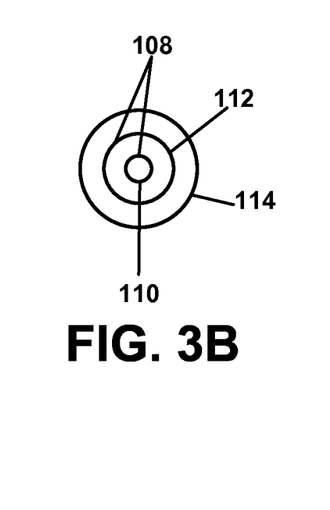
FIG. 3B is a close-up view of a portion of the fiber optic cable of FIG. 3A.
Figure 4:
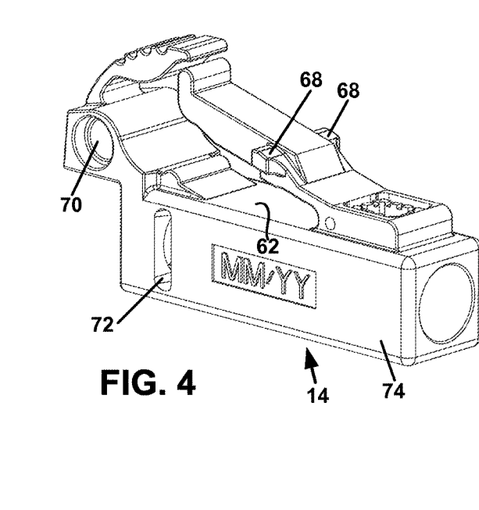
FIG. 4 is a front perspective view of a front housing of the fiber optic connector of FIG. 1.
Figure 5:
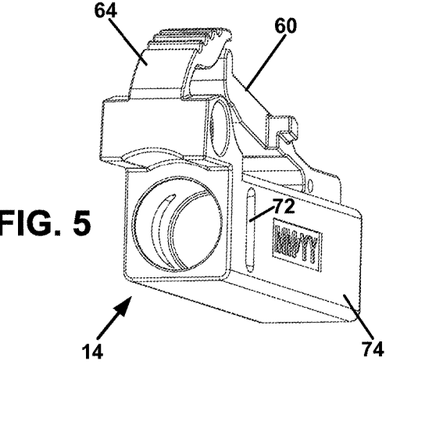
FIG. 5 is a rear perspective view of the front housing of FIG. 4.
Figure 6:
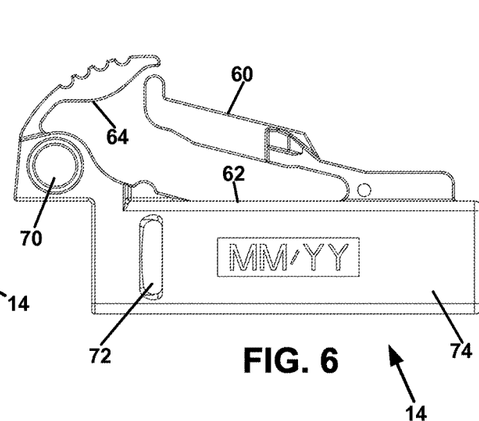
FIG. 6 is a left side view of the front housing of FIG. 4.
Figure 7:
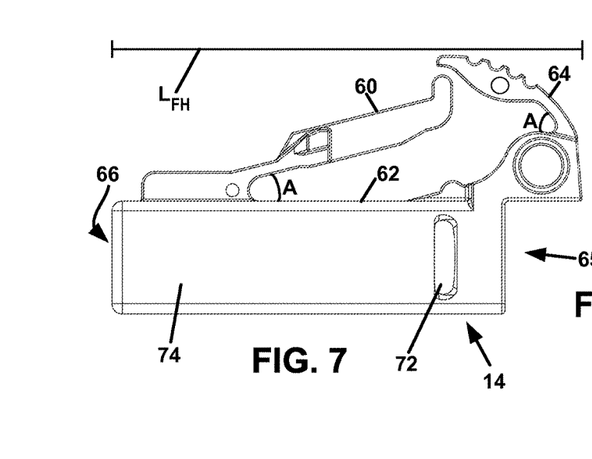
FIG. 7 is a right side view of the front housing of FIG. 4.
Figure 8:
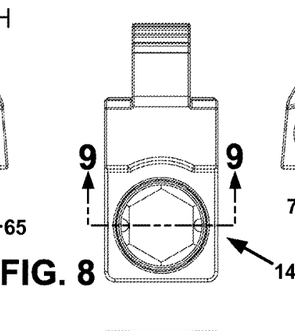
FIG. 8 is a rear view of the front housing of FIG. 4.
Figure 9:
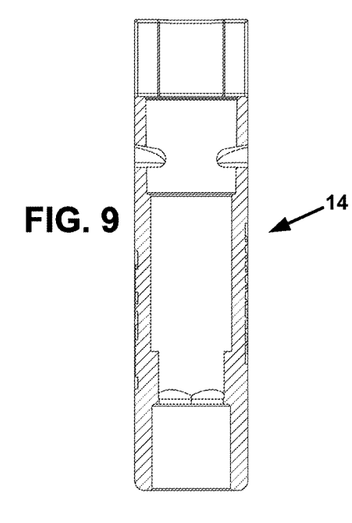
FIG. 9 is a cross-sectional view taken along line 9-9 of FIG. 8.

According to one example embodiment, a fiber optic cable 50 that may be terminated to the fiber optic connector 10 of the present disclosure includes a 1.2 mm cable outer jacket 106 (please refer to FIG. 3A) and a 125 micron optical fiber 108 that is formed from a fiber core 110 and cladding glass 112 (please refer to FIG. 3B). As shown in FIGS. 2, 3, 3A, and 3B, the 125 micron optical fiber 108 may include a coating 114 over the cladding glass portion 112 of the fiber 108 providing a 250 micron outer diameter for the fiber. A strength member layer 48 (e.g., formed from aramid yarns) is provided between the 1.2 mm outer jacket 106 and the 250 micron coating 114.

As shown in FIGS. 1-3, to assemble the fiber optic connector 10, the ferrule assembly 18 is first loaded into the front housing 14 of the connector body 12 from the rear end 65 of the front housing 14. Next, the rear housing 16 is connected to the front housing 14 (e.g., by a snap fit connection) such that the ferrule hub 28 and the spring 32 are captured within the connector body 12, with the front extension 40 of the rear housing 16 fitting inside the rear end 36 of the spring 32, and the rear extension 38 of the ferrule hub 28 fitting inside the front end 34 of the spring 32. Next, an epoxy injection device 116 is inserted through the rear end 82 of the rear housing 16 and is used to inject epoxy into the fiber passage 26 defined through the ferrule 20. Once the epoxy has been applied, the injection device 116 is removed and the end cap 42 is inserted into the rear end 82 of the rear housing 16.

Figure 18:
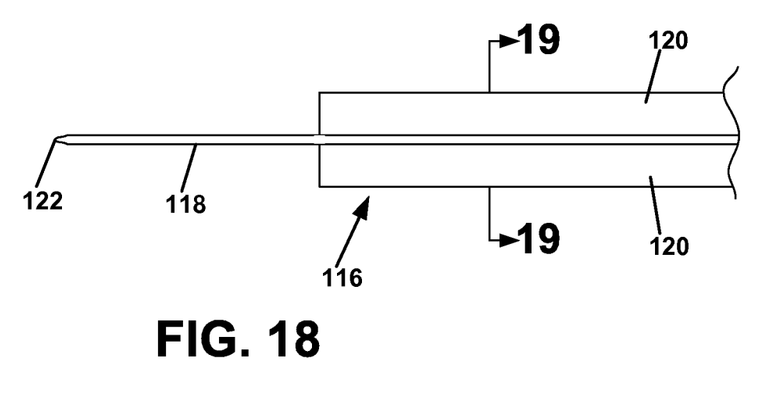
FIG. 18 is a side view of an example injection device that may be used with the fiber optic connectors of FIGS. 1-17 for injecting epoxy into ferrules of the fiber optic connectors of FIGS. 1-17.
Figure 19:
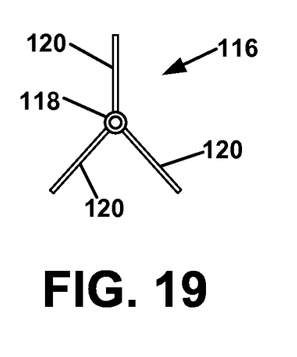
FIG. 19 is a cross-sectional view of the injection device taken along line 19-19 of FIG. 18.

One example of an epoxy injection device 116 that may be used with the fiber optic connector 10 is shown in FIGS. 18 and 19. The injection device 116 includes an injection needle 118 and a plurality of spacers 120 that project radially outwardly from the injection needle 118. The injection needle 118 is inserted into the connector body 12 through the rear end 82 of the rear housing 16 and is moved within the connector body 12 along the longitudinal axis $A_L$ of the connector body 12 until a tip 122 of the injection needle 118 is positioned adjacent the rear end 22 of the ferrule 20. Contact between the spacers 120 and the surface 96 defining the rear housing passage 92 maintains alignment of the injection needle 118 with the longitudinal axis $A_L$ of the connector body 12 during insertion and withdrawal of the injection needle 118. The injection needle 118 is sized in length such that when the spacers 120 abut the tapering transition portion of the rear housing passage 92, the tip 122 of the injection needle 118 is positioned adjacent the rear end 22 of the ferrule 20.

After the withdrawal of the injection device 116 and insertion of the end cap 42, the strain relief boot 52 and the crimp sleeve 46 are inserted over the fiber optic cable 50 and a front end portion of the cable 50 is prepared.

As part of the cable preparation process, the outer jacket 106 is stripped from a front end portion 109 of the optical fiber 108. Also, the coating layer 114 is stripped from the forwardmost portion 111 of the optical fiber 108 intended to be inserted through at least a portion of the fiber passage 26 defined by the ferrule 20, leaving 125 micron fiber core 110 and cladding glass 112. Moreover, the strength member layer 48 is trimmed to a desired length. Once the fiber optic cable 50 has been prepared, the front end portion 109 of the optical fiber 108 is inserted through the end cap 42, through the rear housing passage 92, and into the ferrule 20 which has been potted with epoxy. During the insertion process, the tapered portions of the rear housing passage 92, of the ferrule hub rear extension 38, and of the ferrule 20 assist in guiding the forwardmost end portion 111 of the optical fiber 108 into the ferrule 20. Once the fiber insertion process has been completed, the crimp sleeve 46 is slid forwardly over the rear end 82 of the rear housing 16 and used to crimp the front end of the strength member layer 48 about the exterior surface of the rear housing 16 adjacent to the rear end 82. The strain relief boot 52 is then slid forwardly over the crimp sleeve 46 and the rear end 82 of the rear housing 16.

When the fiber optic connector 10 is fully assembled with the fiber optic cable 50 terminated, the fiber optic connector 10 retains the overall outer dimension of a conventional LC connector such that two fiber optic connectors 10 can be mounted side by side in a standard duplex configuration.

Figure 16:
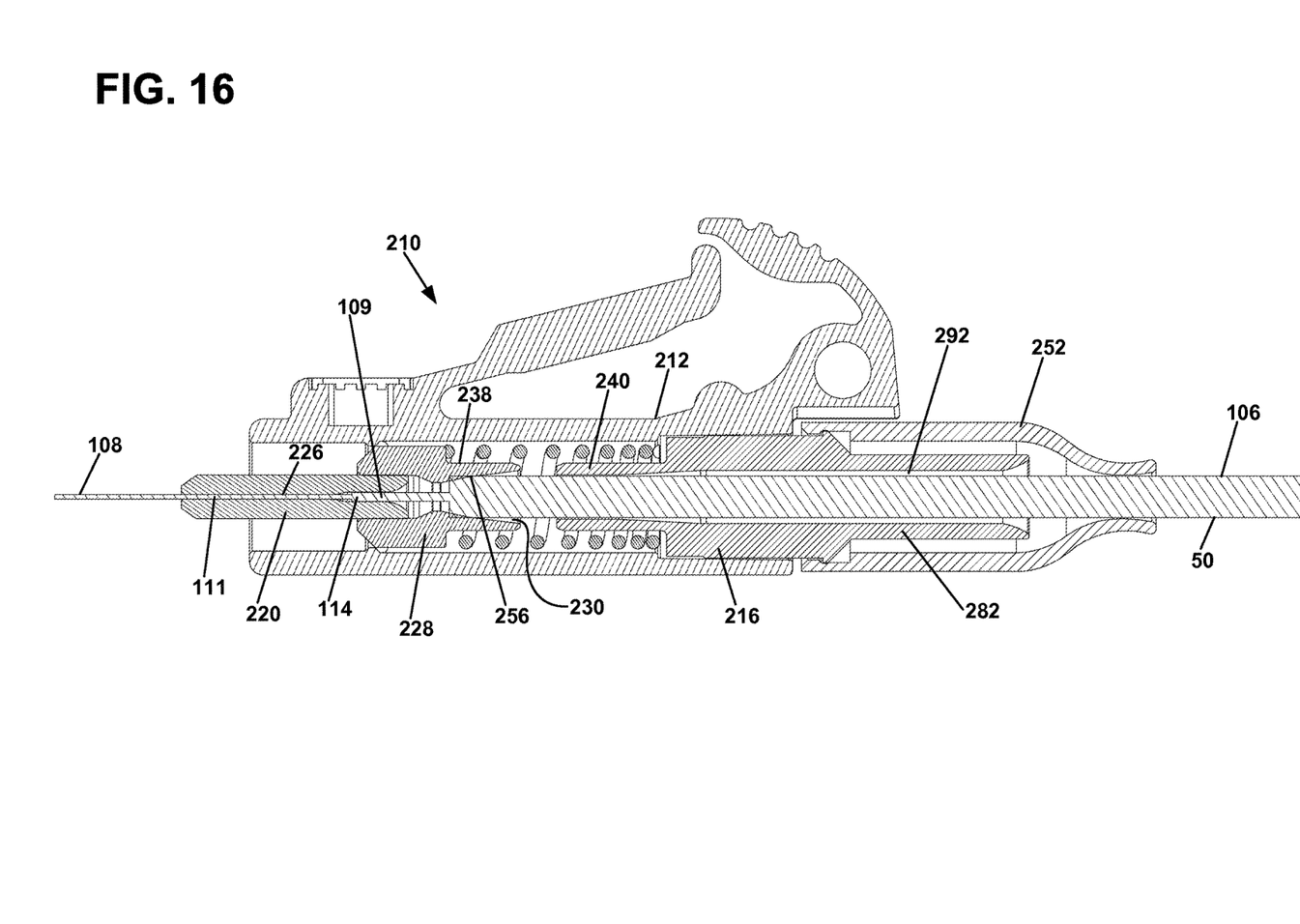
FIG. 16 is a cross-sectional view that longitudinally bisects a second embodiment of a fiber optic connector in accordance with the principles of the present disclosure.

FIG. 16 illustrates a second embodiment of a fiber optic connector 210 in accordance with the principles of the present disclosure having features similar to those of the fiber optic connector 10 of FIGS. 1-15. The fiber optic connector 210 of FIG. 16 is configured to terminate a fiber optic cable 50 without the use of a crimp sleeve (such as crimp sleeve 46). In the fiber optic connector 210 of FIG. 16, the cable 50 is prepared and inserted into the connector body 212 such that at least a portion of the outer jacket 106 extends into the rear extension 238 of the ferrule hub 228. The outer jacket 106 makes contact with the tapered portion 256 of the ferrule hub passage 230 that tapers inwardly as it extends in a forward direction. A strain relief boot 252 is inserted over the rear end 282 of the rear housing 216 after the fiber optic cable 50 has been inserted into the connector body 212 following epoxy potting. An end cap and a crimp sleeve are not used in the assembly of the connector 210 shown in FIG. 16.

According to one example embodiment, the connector 210 of FIG. 16 may be used to terminate a fiber optic cable 50 having a 1.2 mm outer jacket 106, 125 micron fiber 108 made up of a fiber core 110 and cladding glass layer 112, and a 250 micron coating layer 114 surrounding the fiber core 110 and cladding glass layer 112.

The fiber optic cable 50 is prepared such that the outer jacket 106 is stripped from the front end portion 109 of the optical fiber 108. Also, the coating layer 114 is stripped from the forwardmost portion 111 of the optical fiber 108 intended to be inserted through at least a portion of the fiber passage 226 defined by the ferrule 220, leaving the 125 micron fiber core 110 and cladding glass 112. Once the fiber optic cable 50 has been prepared, the front end portion 109 of the optical fiber 108 is inserted through the rear end 282 of the rear housing 216 through the rear housing passage 292, and into the ferrule 220 which has been potted with epoxy. The 250 micron coating layer 114 may be captured within a portion of the fiber passage 226 of the ferrule 220 and the outer jacket 106 may be press fit against the tapered portion 256 of the ferrule hub 228. The rear housing passage 292 may define an inner diameter similar in size to the 1.2 mm cable outer jacket 106, especially at the front extension region 240 of the rear housing 216 for guiding the cable 50 within the connector body 212.

Figure 17:
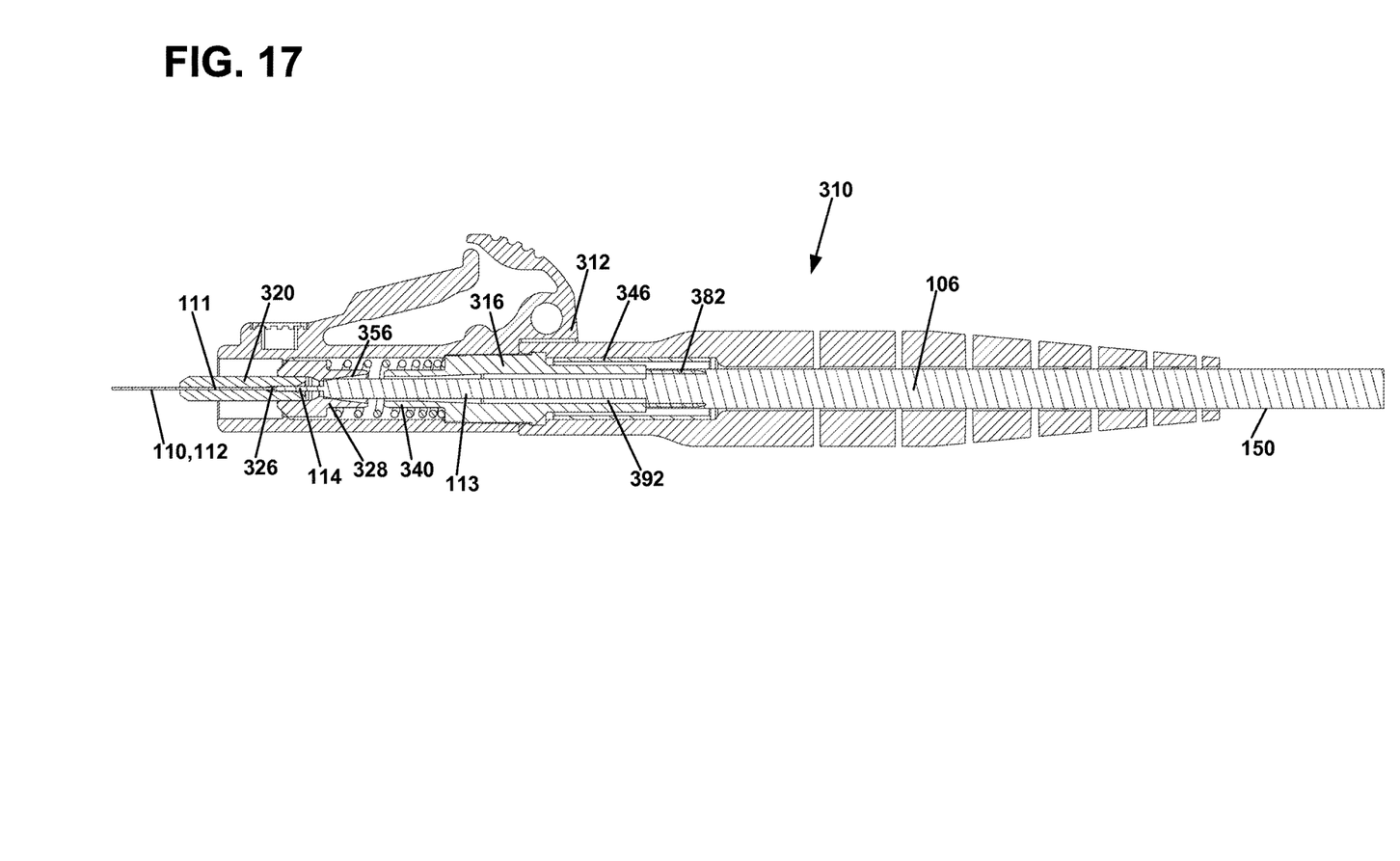
FIG. 17 is a cross-sectional view that longitudinally bisects a third embodiment of a fiber optic connector in accordance with the principles of the present disclosure.

FIG. 17 illustrates a third embodiment of a fiber optic connector 310 in accordance with the principles of the present disclosure. The fiber optic connector 310 of FIG. 17 shares features with both the connector 10 of FIGS. 1-15 and the connector 210 of FIG. 16.

According to one example embodiment, the fiber optic connector 310 of FIG. 17 is configured for terminating a 1.7/2.0 mm outer jacketed cable 150 having a 900 micron tight buffer tube 113, a 250 micron coating layer 114 surrounding a 125 micron fiber core 110 and cladding glass layer 112.

Similar to the connector 10 of FIGS. 1-15, the fiber optic connector 310 utilizes a crimp sleeve 346 in crimping a strength member layer 48 of the fiber optic cable 150 to the rear end 382 of the rear housing 316. Similar to the connector 210 of FIG. 16, the fiber optic connector 310 is configured such that the 900 micron tight buffer tube 113 extends all the way to the tapered portion 356 of the ferrule hub 328 after the outer jacket 106 has been stripped thereoff. As in the previous embodiments of the connectors 10, 210 of FIGS. 1-15 and FIG. 16, the frontmost 125 micron end portion 111 of the optical fiber 108 is inserted through the rear end 382 of the rear housing 316 through the rear housing passage 392, and into the ferrule 320 which has been potted with epoxy. The 250 micron coating layer 114 may be captured within a portion of the fiber passage 326 of the ferrule 320. And, as stated above, the 900 micron tight buffer tube portion 113 may extend into the tapered portion 356 of the ferrule hub 328.

As in the second embodiment of the connector 210 of FIG. 16, the rear housing passage 392 of the fiber optic connector 310 may define an inner diameter similar in size to the 900 micron tight buffer tubing 113, especially at the front extension region 340 of the rear housing 316 for guiding the cable 150 within the connector body 312.

Although in the foregoing description, terms such as "top," "bottom," "front," "back," "rear," "right," "left," "upper," and "lower" may have been used for ease of description and illustration, no restriction is intended by such use of the terms. The connectors described herein can be used in any orientation, depending upon the desired application.

The above specification, examples and data provide a description of the inventive aspects of the disclosure. Many embodiments of the disclosure can be made without departing from the spirit and scope of the inventive aspects of the disclosure.

What is claimed is:

1. A fiber optic connector comprising:
a connector body defining a longitudinal axis, the connector body including a front housing that connects to a rear housing, the front and rear housings having lengths that extend along the longitudinal axis;
a ferrule assembly mounted at least partially in the connector body, the ferrule assembly being movable relative to the connector body along the longitudinal axis of the connector body, the ferrule assembly including a ferrule having a rear end supported in a ferrule hub, the ferrule having a front face accessible at a front end of the connector body, the ferrule defining a fiber passage that extends through the ferrule along the central longitudinal axis from the rear end of the ferrule to the front face of the ferrule; and
a spring positioned within the connector body for biasing the ferrule assembly in a forward direction toward a forwardmost position of the ferrule assembly, the spring having a first spring length when the ferrule assembly is in the forwardmost position, wherein the ferrule hub includes a rear extension that fits inside a front end of the spring, the rear extension defining a rear extension length;
the rear housing including a front extension that fits inside a rear end of the spring, the front extension having a front extension length, wherein the front extension length is longer than the rear extension length and wherein the fiber optic connector also defines a gap between the front extension of the rear housing and the rear extension of the ferrule hub when the ferrule assembly is in the forwardmost position.

2. The fiber optic connector of claim 1, wherein the gap has a first dimension measured between the front extension of the rear housing and the rear extension of the ferrule hub when the ferrule assembly is in the forwardmost position, the first dimension being measured in an orientation along the longitudinal axis of the connector body, the front extension length being longer than the first dimension of the gap.

3. The fiber optic connector of claim 2, wherein the first dimension of the gap is at most 25 percent of the first spring length.

4. The fiber optic connector of claim 1, wherein the front extension length is at least 25 percent of the first spring length.

5. The fiber optic connector of claim 1, wherein the rear extension has a rear extension length that is at least 25 percent of the first spring length.

6. The fiber optic connector of claim 1, wherein the ferrule hub defines a ferrule hub passage that co-axially aligns with the fiber passage of the ferrule, wherein the ferrule hub passage includes a tapered portion within the rear extension that tapers inwardly as the tapered portion extends in a forward direction.

7. The fiber optic connector of claim 6, wherein the fiber passage of the ferrule has a tapered portion at the rear end of the ferrule, the tapered portion of the fiber passage tapering inwardly as the fiber passage extends in the forward direction.

8. The fiber optic connector of claim 1, wherein the rear housing includes first and second outer shoulders positioned at an intermediate location along the length of the rear housing, the first and second outer shoulders being separated by a spacing measured along the longitudinal axis of the connector body, wherein the second outer shoulder is rearward of the first outer shoulder, wherein the rear housing defines a plurality of flats at the first outer shoulder, and wherein the fiber optic connector includes a boot that snaps over the second outer shoulder and abuts against the first outer shoulder.

9. The fiber optic connector of claim 1, further comprising an end cap that fits in a rear end of the rear housing, the end cap defining an end cap passage that extends along the longitudinal axis of the connector body, the rear housing defining a rear housing passage that extends along the longitudinal axis of the connector body.

10. The fiber optic connector of claim 9, further comprising a crimp sleeve secured over the rear end of the rear housing, the crimp sleeve being configured to retain the end cap within the rear housing.

11. The fiber optic connector of claim 1, wherein a fiber optic cable is coupled to the fiber optic connector, the fiber optic cable including an optical fiber positioned within a jacket, wherein the optical fiber includes a bare glass portion secured within the fiber passage of the ferrule by epoxy, and wherein the jacket has a terminal end positioned within the hub of the ferrule assembly.

12. The fiber optic connector of claim 11, wherein the jacket has an outer diameter of about 1.2 millimeters.

13. The fiber optic connector of claim 11, wherein the fiber optic cable includes strength members that are secured to the rear housing by a crimp sleeve to provide strain relief.

14. The fiber optic connector of claim 1, further comprising a latch for securing the connector body in a fiber optic adapter, the latch being integrally formed with the front housing.

15. The fiber optic connector of claim 1, wherein the rear housing has retention tabs that snap-fit within corresponding openings defined by the front housing.

16. The fiber optic connector of claim 1, wherein the fiber optic connector is an LC connector.

17. A method for injecting epoxy into the fiber passage of the ferrule of the fiber optic connector of claim 9 using an injection device including an injection needle and a plurality of spacers that project radially outwardly from the injection needle, wherein the injection needle is inserted into the connector body through the rear end of the rear housing, and is moved within the connector body along the longitudinal axis of the connector body until a tip of the injection needle is positioned adjacent the rear end of the ferrule, and wherein contact between the spacers and a surface defining the rear housing passage maintains alignment of the injection needle with the longitudinal axis of the connector body during insertion and withdrawal of the injection needle.

* * * * *